United States Patent [19]

Florea et al.

[11] Patent Number: 4,800,559

[45] Date of Patent: Jan. 24, 1989

[54] ETHERNET AND BROADBAND LAN INTERFACE

[75] Inventors: Michael Florea, Springfield; Stephen C. Foster, Herndon; Gary J. Bisaga, Reston, all of Va.

[73] Assignee: Contel Information Systems, Inc., Fairfax, Va.

[21] Appl. No.: 890,457

[22] Filed: Jul. 30, 1986

[51] Int. Cl.$^4$ .............................................. H04J 3/24
[52] U.S. Cl. ...................................................... 370/94
[58] Field of Search ........................ 370/60, 94, 85, 88

[56] References Cited

U.S. PATENT DOCUMENTS

| | | |
|---|---|---|
| Re. 31,182 | 3/1983 | Crager et al. |
| 4,017,688 | 4/1977 | Callens et al. |
| 4,074,232 | 2/1978 | Otomo et al. |
| 4,099,024 | 7/1978 | Boggs et al. |
| 4,271,507 | 6/1981 | Gable et al. |
| 4,314,233 | 2/1982 | Clark |
| 4,317,196 | 2/1982 | Ulug |
| 4,317,197 | 2/1982 | Ulug |
| 4,320,500 | 3/1982 | Barberis et al. |
| 4,409,592 | 10/1983 | Hunt |
| 4,435,804 | 3/1984 | Tan |
| 4,597,078 | 6/1986 | Kempf ..................... 370/88 |
| 4,675,866 | 6/1987 | Takumi et al. ............ 370/85 |

Primary Examiner—Douglas W. Olms
Assistant Examiner—Wellington Chin
Attorney, Agent, or Firm—Mason, Fenwick & Lawrence

[57] ABSTRACT

A broadband/baseband interface device for passing data packets accurately and as swiftly as possible from an interface of one medium, (e.g., Ethernet) through to an interface of another medium (e.g., RF modem) in near real time. Incoming data on the broadband medium is received both at the data RAM where it is stored and in a CRC detection module which performs cyclic redundancy checking calculations upon the packet, sending signals upon calculating positive results to both a CRC counter and to a CRC RAM. When the receipt of a packet from the broadband medium is ended, the signal ends, leaving an unpredictable collection of "dribble" bits. Since each positive CRC calculation was noted by the CRC detector and its indicator was stored in an address in the CRC RAM, the exact end of the packet in the data RAM can be positively identified and distinguished from the random "dribble" bits. The counter is then decremented during the baseband transmission process until zero is reached, corresponding to and identifying the end of the packet. At that time, the baseband media driver is disabled.

11 Claims, 10 Drawing Sheets

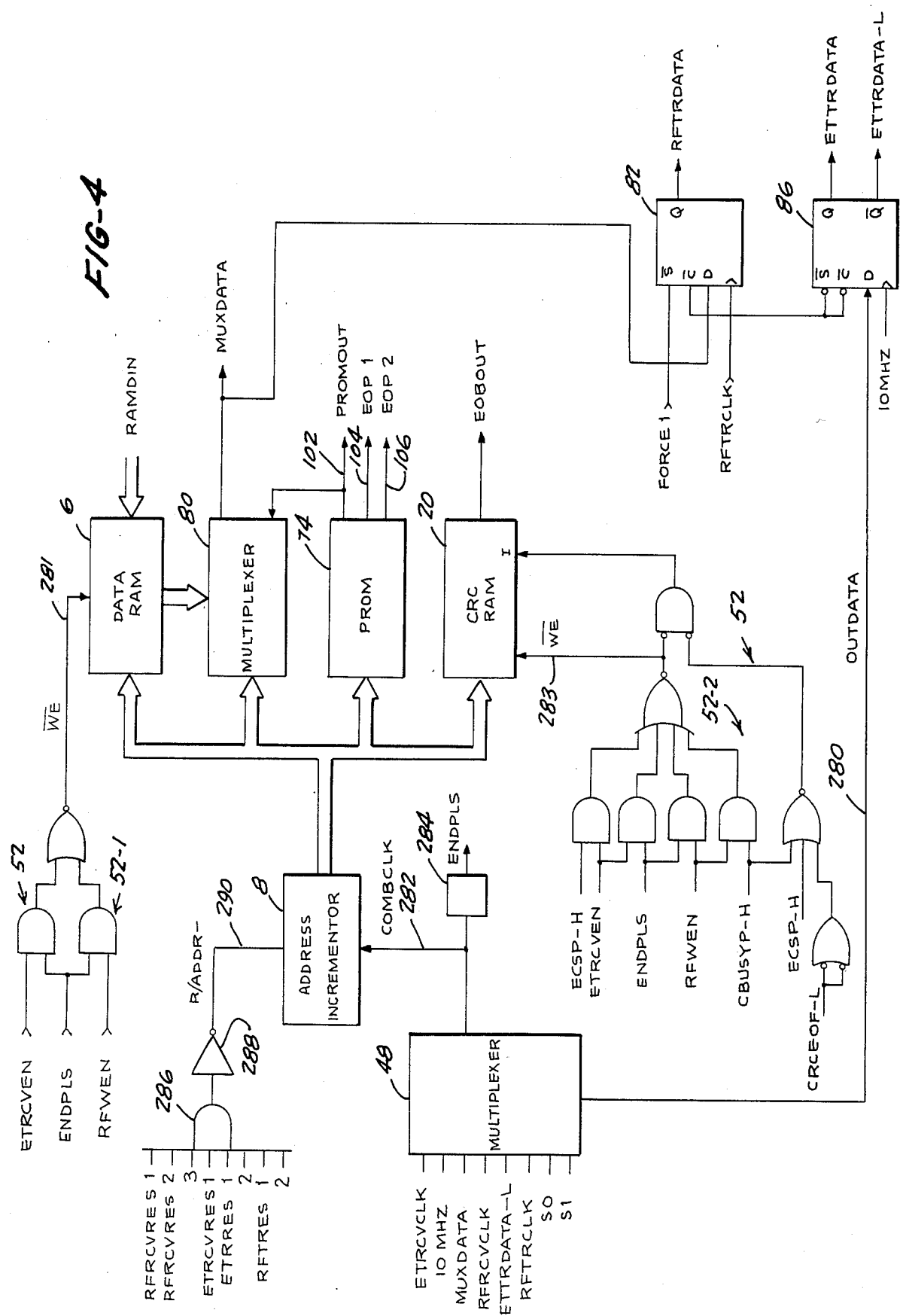

ETHERNET AND BROADBAND LAN INTERFACE

FIELD OF THE INVENTION

The present invention relates to digital communications, and more specifically the invention is directed to an apparatus for conditioning signals for transmission between baseband networks, such as an Ethernet system, and modulated carrier broadband networks, such as a broadband LAN (local area network) using an RF modem.

BACKGROUND OF THE INVENTION

The art of digital communications has been plagued for a long time by the incompatibility of the two main strategies for moving large amounts of data in the form of binary digital signals from one device to another in a very short period of time.

The first of the two strategies, baseband transmission, involves sending a controlled physical manifestation (e.g. a digital signal) from one device through a carrying medium, such as a wire or cable, to another device having some means for noticing the physical manifestation and sensing and interpreting the nature of the control. Typically the physical manifestation is a particular voltage level, controlled as to level and duration, carried over an electrical wire to some kind of sensing device at another point on the wire where some means is employed for noting the voltage levels and their durations, which when decoded reveal a message. Given the elegant simplicity of the baseband system it is not surprising that very great data transmission speeds can be obtained with it.

A feature of baseband systems which contributes to their speed is the abruptness of the typical baseband signal. For example, a transition from a high voltage to a low voltage in a typical baseband signal is accomplished in less than 10 nanoseconds, whereupon, the data represented by that transition is immediately ready for use in a receiving device.

An important aspect of communication network systems concerns how to deal with simultaneous transmission of messages on the same medium. "Rules of good behavior" are typically incorporated into a communication system to deal with situations where multiple messages may collide. Means are typically provided in communications device, therefore, to sense when access to the line is open, and further to sense whether a second signal is being put on the line to collide when the first signal is transmitting, whereupon the first signal is aborted and retransmitted at a later time. These means are called "Carrier Sense Multiple Access" or CSMA procedures, and when they also have the "Collision Detection" feature, they are called CSMA/CD procedures. These rules of behavior are implemented on many systems, baseband and broadband alike.

The second of the two strategies, broadband transmission, differs from baseband in a fundamental way: where baseband contemplates a digital signal placed directly on the wires, the broadband signal is represented by a modulation, a carefully controlled change of the carrier wave, such as in amplitude or frequency. By careful attention to selection of an appropriate portion of the electromagnetic spectrum in which to transmit the carrier wave, it is possible to provide a broadband medium where many discrete channels, or bands, may be recognized, each of which can carry its own set of messages simultaneously with those of each other channel, or band. Thus, by the provision of a large plurality of message bands, a very large amount of data may be carried over a broadband system.

Before data in the form of a series of modulations on a carrier wave can be used by a device to which it has been sent, it must first be recognized and then translated into a form usable by the device. This process is called demodulation, and is done by a device called a "modem". The word "modem" comes from the two reciprocal processes which it performs: modulating data and demodulating it. A broadband modem must also have means for selecting the particular frequency or frequencies of the carrier wave from which it is desired to reads the incoming data, or upon which it is desired to send outgoing data.

In summary, baseband system are single-channel and digital while broadband systems are multichannel, analog and use a carrier wave.

In data communications, a packet is a group of binary digits, including data and control elements, which is switched and transmitted as a composite whole. The data and control elements and possibly error control information are arranged in a specified format. Regardless of the type of communications medium, devices receiving packets must by some method be able to detect when the end of packet has occurred. Baseband systems normally use no special indicator, but rather simply assume that when they stop receiving data the packet is ended. This is possible because they are really equivalent to a piece of wire carrying digital data, and as soon as the transmitting device stops sending data, the receiving device can detect the lack of data transfer.

A major difficulty in the way of easily interfacing broadband packets into a baseband system is the fact that the broadband carrier wave does not die as abruptly after transmission of a data packet, as does the baseband signal. The end of packet is detected in a baseband system by lack of data transfer on the medium. However, since the broadband carrier does not immediately die off, the broadband end-of-packet is not reliably recognized using the baseband method. Instead, the modem continues to detect data on the medium where none should actually exist. These extra binary digits of data are called "dribble" bits.

One system which operates in near real-time works by requiring a "post-amble" of a peculiarly ordered set of bits at the end of the data packet after the regular end-of-packet code. The ordered set of bits are calculated uniquely for each packet. The post-amble ending code is compared to a known ending code. As the packet passes through a shift register in the receiving device. The end of the packet is thereby recognized when the post-amble ending code matches the known ending code. A drawback of the post-amble system is that the post-amble adds extra overhead to the transmitting-receiving process, which adds to the complexity and expense of the data handling.

There is thus a need for an interface device, operative in real time, for easily and economically moving data between two incompatible communications systems such as broadband and baseband. The present invention is directed toward filling that need.

SUMMARY OF THE INVENTION

The present invention relates to a broadband/baseband interface device for passing data packets accurately and as swiftly as possible from an interface of one medium (e.g., Ethernet), through to an interface of another medium (e.g., RF modem) in real time. The device is operative in four states: Broadband (RF) Receive, Baseband (Ethernet) Transmit, Baseband (Ethernet) Receive and Broadband (RF) Transmit. Among these, the Broadband Receive state is the default state and the Baseband Receive is dominant. Thus, if during a particular time a Broadband Receive, Baseband Transmit sequence is in progress when a Baseband cable-busy is initiated, the Baseband Receive interrupts the Broadband Receive, resets all addresses to zero, receives the broadband data packet and processes it through transmission in the Broadband Transmit state. The interrupted transmission which had been going from the broadband side to the baseband side is not lost because the assumed broadband transmission protocol will cause the packet to be sent again if an acknowledgement is not received for the first transmission within a reasonable time.

Historically it has been possible to transmit data into a storage device from either baseband or broadband systems, sorting it either permanently or semipermanently, and retrieving it via some mechanical transitional means such as punched or magnetic tape, magnetic disk or the like and retransmitting it over the other medium, but this does not answer for real-time or near real-time requirements.

In a preferred embodiment of the invention, a data packet is received over a baseband medium and is stored in a data RAM according to addressing instructions supplied from an address incrementer. When the data packet is completely received, the data is transmitted out onto a broadband medium. The data must have a post-amble as stated before so that the receiving device at the other end may detect end-of-packet. These post-amble bits must have been previously computed by the device which transmitted the packet over the baseband medium and are computed separately for each packet by the cyclic redundancy check (CRC) algorithm. Incoming data on the broadband medium (e.g., modem interface) is received both at the data RAM where it is stored and in a CRC detection module which performs inverted cyclic redundancy checking (CRC) calculations in a conventional manner upon the data packet, sending signals upon calculating positive results to both a CRC counter and to a CRC RAM. It would by convenient if the end of packet could always be detected by the occurrence of a positive CRC result. However, since a given CRC remainder does not uniquely define a packet, it is possible to get a positive result in the middle of a packet. Irrespective of this, there will always be at least a positive indication at the actual end of packet. The CRC counter counts the number of such positive calculations within a data packet. The CRC RAM uses the same addressing circuitry as the data RAM, and therefore the locations of data indicating positive CRC calculations exactly correspond with the locations in the data RAM.

When the receipt of a data packet from the broadband medium is ended, the signal ends leaving an unpredictable collection of "dribble" bits as indicated previously. The end of the broadband transmission is noted by a cable busy detector which goes inactive upon termination of the broadband transmission thereby passing a transition signal to a control mechanism to begin the baseband transmission procedure.

Since each CRC calculation during the receipt of the broadband data packet was noted by the CRC detection module and its indication was stored in an address in the CRC RAM which corresponds exactly to the address of the corresponding data bit in the data RAM, the exact end of the data packet in the data RAM can be positively identified and distinguished from the "dribble" bits which have been unintentionally stored in the data RAM during the reception process.

If a positive CRC calculation should occur within the data packet before the end of the packet, the signal indicating the positive calculation increments the CRC counter so that the exact number of positive CRC calculations associated with the packet is known and is stored in the counter. The counter is then decremented during the baseband transmission process until zero is reached, corresponding to and identifying the end of the packet. Thus the correct count of CRC's positively identifies the end of the packet.

In the baseband transmission mode, data is transmitted simultaneously from the data RAM and the CRC RAM, under control of the address incrementer. The data continues to be transmitted through a baseband media driver, such as a Manchester encoder, as long as a non-zero count signal is generated by the counter. As each positive CRC indicator passes out of the CRC RAM, the counter is decremented until it returns to ZERO count. At precisely that time, the baseband media driver is disabled. Since that time corresponds directly with the transmission of the last bit in the actual data packet (as distinguished from the following "dribble" bits), the end of the data packet is identified to the baseband system and its successful reception at its intended destination can therefore be assured.

Thus it is a primary object of the present invention to provide a simple interface for receipt of data packets from broadband media which may be readily transmitted on baseband media and vice versa.

It is a further object of the present invention to provide means for rapidly identifying ends of data packets when received over broadband media to permit their immediate and effective retransmission on baseband media.

Additional objects of the present invention will become apparent from a reading of the specification and appended claims in which preferred, but not necessarily the only forms of the invention will be described in detail, taken in connection with the drawings accompanying and forming part of the application.

BRIEF DESCRIPTION OF THE DRAWINGS

FIG. 4 is a logic block diagram of the memory and address circuitry of the interface device of FIG. 2.

DETAILED DESCRIPTION OF A PREFERRED EMBODIMENT

Figure 1:
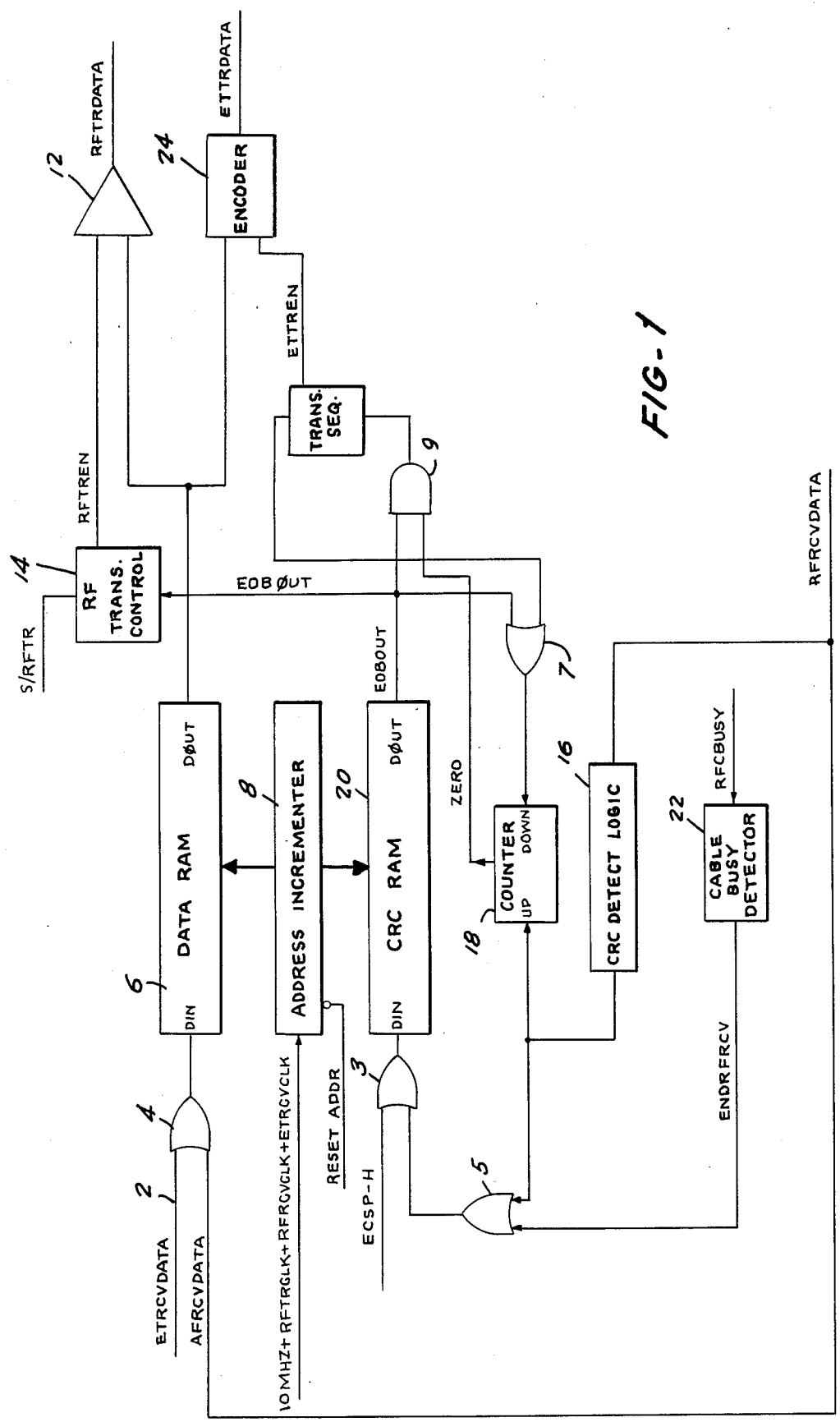
FIG. 1 is a general block diagram of the interface device embodying the teachings of the present invention.

In describing preferred embodiments of the invention illustrated in the drawings, specific terminology will be resorted to for the sake of clarity However, the invention is not intended to be limited to the specific terms so selected, and it is to be understood that each specific term includes all technical equivalents which operate in a similar manner to accomplish a similar purpose.

In describing a preferred embodiment of the subject invention certain conventions have been adopted regarding the explanation of certain circuitry found in the interface device and the logic state of certain signals. The use of a small dot at the input of a circuit element (see for example the $\overline{S}$ input of flip-flop 240 in FIG. 3) indicates that input is active-low. The use of a small dot at the output of a circuit element (the $\overline{Q}$ output of flip-flop 240) indicates that the output signal is inverted. The use of a minus sign after a signal name (e.g., FORCE1−) indicates the inverse of the signal. The use of a −L or −H after a signal name (e.g., SCSP−L or ECSP−H) indicates that the named signal is either logic low (−L) or logic hi (−H). Further, the use of the term "line" to describe the medium through which signals are transmitted encompasses both single and multiple conductors.

A preferred embodiment of the present invention is very simply and schematically shown in FIG. 1, wherein the interface device of the invention may be seen to be implemented as a state device having the following states (at the broadest and simplest level of analysis): Broadband (RF) Receive, Baseband (Ethernet) Transmit, Baseband (Ethernet) Receive and Broadband (RF) Transmit.

Since the function of the device is to pass data packets accurately and as swiftly as possible from an interface of one medium through to an interface of the other medium, the device is not burdened with buffers for large amounts of data storage, beyond what is needed for immediate processing. Thus the states are sequenced so that a Broadband Receive state is followed immediately by a Baseband Transmit state, and a Baseband Receive state is followed immediately by a Broadband Transmit state. Among these, the Broadband Receive state is the default state and the Baseband Receive is dominant. Thus, if during a particular time an Broadband Receive - Baseband Transmit sequence is in progress when an Baseband cable-busy is detected, the Baseband Receive interrupts the Broadband Receive resetting all addresses to zero, receives the baseband data packet and processes it through transmission in the Broadband. Transmit state. The interrupted transmission which had been going from the broadband side to the baseband side is not lost because the assumed transmission protocol will cause the packet to be sent again if an acknowledgement is not received for the first transmission within a reasonable time.

When both media are quiet, the sequencing logic leaves the device in its default state, which is the Broadband Receive state. The default state has two phases which may be described as an active phase and an idle phase. When actually receiving a packet from broadband, barring power failures, the Broadband Receive - Baseband Transmit sequence of events is not interruptible due to a "jam" signal sent to the baseband side to inhibit connected devices from transmitting. In the idle phase, however, the Broadband Receive sequencer passes control to the Baseband Receive sequencer if activity is detected at the Baseband interface. In FIG. 1, a data packet is received over a baseband medium 2 (e.g., an Ethernet standard interface) through a data switch symbolically represented by OR gate 4, and is stored in a data RAM 6 according to addressing instructions supplied from an address incrementer 8. When the data packet is completely received, the data is transmitted out onto the broadband medium 10 through a conventional line driver 12 which is activated by a transmit-enable signal RFTREN generated by an RF transmission control 14. Depending on the mode of operation, the address incrementer 8 is clocked by the systems nominal rate of 10 MHz; an RF transmit clock, RFTRCLK; an RF receive clock, RFRCVCLK; or an Ethernet receive clock, ETRCVCLK.

Incoming data on the broadband medium 3 (e.g. modem interface) is received both at the data RAM 6 where it is stored after passing through the multiplexing switch 4, and in a CRC detection module 16 which performs cyclic redundancy checking (CRC) calculations in a conventional manner upon the data packet, sending signals upon calculating positive results to both a CRC counter 18 and to a CRC RAM 20. The CRC RAM 20 uses the same addressing circuitry as the data RAM 6, and therefore the locations of data indicating positive CRC calculations exactly correspond with the locations in the data RAM 6. The control logic for the CRC RAM and CRC counter 18 is symbolically represented by OR gates 3, 5 and 7 and AND gate 9.

When the receipt of a data packet, from the broadband medium 3, is ended, the signal ends leaving an unpredictable collection of "dribble" bits as indicated previously. The end of the broadband transmission is noted by the cable busy detector 22 which goes inactive upon receipt of an RF cable busy signal RFCBUSY, thereby passing a transition signal to a control mechanism (not shown in FIG. 1) to begin the baseband transmission procedure.

Since each positive CRC calculation during the receipt of the broadband data packet was noted by the CRC detection module 16 and its indicator was stored in an address in the CRC RAM 20 which corresponds exactly to the address of the corresponding data bit in the data RAM 6, the exact end of the data packet in the data RAM 6 can be positively identified and distinguished from the random "dribble" bits which have been stored in the data RAM 6 during the reception process.

If a positive CRC calculation should occur within the data packet before the end of the packet, the signal indicating the positive calculation increments the CRC Counter 18 so that the exact number of positive CRC calculations associated with the packet is known and is stored in the counter 18. The counter 18 is then decremented during the baseband transmission process until zero is reached, corresponding to and identifying the end of the packet.

In the baseband transmission mode, data is transmitted simultaneously from the data RAM 6 and the CRC RAM 20, under control of the address incrementer 8. The data continues to be transmitted through a baseband media driver, such as a Manchester encoder 24, as long as a non-zero count signal is generated by the counter 18. As each positive CRC indicator passes out of the CRC RAM 20, the counter 18 is decremented until it returns to ZERO count. At precisely that time, the baseband media driver 24 is disabled. Since that time corresponds directly with the transmission of the last bit in the actual data packet (as distinguished from the following "dribble" bits) the end of the data packet is identified to the baseband system and its successful reception at its intended destination can therefore be assured.

A more detailed description of a preferred embodiment of the subject interface device is shown in FIG. 2. The device generally designated as 30 is interconnected between a conventional RF modem interface 32 and a Ethernet standard interface 34. The interface device 30 is connected to the RF modem interface through a series of line receivers 33 through 36 and a series of line drivers 37 through 39. The output of line receiver 33 provides an RF receive clock signal RFRCVCLK from the RF modem (not shown) on line 40 which is fed to the clock input of D flip-flops 42 and 44. The signal is also fed to the CRC detect logic 16 and the clock selector 48.

The output of line receiver 34 contains the RFRCVDATA signal which is fed to the D input of flip-flops 42 and 44. The signal is also fed to the CRC detection logic 16. The output of line receiver 35 is fed to a 17-bit delay 50 and one of the inputs of clock selector 48, from which the various system clock signals are selected in response to clock control signals S0 and S1. The output of line receiver 36 provides an RFCOLLDET signal, which indicates the presence of a collision on the RF cable associated with the RF modem. This signal is sued by the FPLS 160 to respond to collisions on the RF cable.

Line driver 39 provides an RF transmission enable signal, RFTREN, to the RF modem interface to turn on the RF modem transmitter. Line driver 37 converts the RFTREN signal to a signal, MODCOLLCLR, for clearing the latch associated with the transmission of the signal, RFCOLLDET, on receiver 36 which indicates the presence of a collision on the RF cable. Finally, line driver 38 provides the RF transmission data, RFTRDATA, to the modem interface. An RF cable busy signal, CBUSY, is taken directly from the RF modem interface and fed to, among other things, the 17-bit delay 50 and the write-enable logic 52.

The Q output of D flip-flop 42 provides the RF received data, RFRCVDATAR, delayed by one clock cycle, on line 54. This same signal is fed into one of the inputs of a multiplexer 56. The $\bar{Q}$ output of D-flip-flop 44 is fed as a preamble detection signal, PREAMBDET, to a broadband receive sequencer 58. The Ethernet standard interface through lines 60 and 62 is operatively connected to a Manchester decoder 64 which has three output signals on lines 66, 67 and 68. The signal, ETRCVDATA, on line 66 represents data received from the Ethernet device. The signal, ETRCVCLK, on line 67 represents the clock signal derived from the Manchester decoder. Finally, the signal, ETRCVDET, on line 68 denotes that received data is being fed into the Manchester decoder. The output on line 66 of the Manchester decoder is fed to the input of multiplexer 56, the output of which provides data along line 70 to the data RAM 6. The write-enable logic 52 provides a write signal $\overline{WE}$ to the data RAM on lines 72. The address incrementer 8 provides signals to the data RAM 6, the CRC RAM 20 and a programmable read only memory (PROM) 74. The write-enable logic 52 as well as the address incrementer 8 receive signals on lines 76 from the output of the clock selector 48. The address incrementer also receives a signal from the broadband receive sequencer 58. An Ethernet receive sequencer 122, an RF transmit sequencer 118, and an Ethernet transmit sequencer 96 also provide signals, RADDR, to reset the address incrementer. The output of the data RAM 6 is fed to one of the two inputs of multiplexer 80 which has its output fed to the data input of a flip-flop 82 and also to an input of a further multiplexer 84. Flip-flop 82 provides the RF transmit data at its Q output and is clocked by an RFTRCLK signal received from line receiver 35.

The output of multiplexer 84 is fed to the D-input of flip-flop 86. This flip-flop receives a clock signal of 10 MHz. The Q output of flip-flop 86 provides a signal for transmitting Ethernet data to a Manchester encoder 90. The $\bar{Q}$ output of flip-flop 86 is fed to the other input of multiplexer 84. The Manchester encoder provides two output signals to the Ethernet interface on lines 92 and 94. The signal on line 92 is the inverse of the signal on line 94. Ethernet transmit sequencer 96 feeds a signal, ETTREN, which starts transmitting the RAM buffer to the Ethernet interface. This signal is fed to the Manchester encoder on line 98. Finally, the Manchester encoder receives an oscillation signal, OSC, on line 100 from the timing circuitry 153. The OSC signal is required to be twice the transmission bit rate to correctly encode the data.

The PROM 74 has three outputs. The first output produces a signal, PROMDOUT, on line 102 which contains the Ethernet preamble. The second signal, EOP1, is produced on line 104 and signifies the end of the Ethernet preamble. Finally, the PROM produces a signal, EOP2, on line 106 which indicates the middle of the Ethernet preamble.

The signal on line 102 is fed to an input of the multiplexer 80 and also to the broadband receive sequencer 58. The signal on line 104 is fed to an input of the Ethernet transmit sequencer 96 and the signal on line 106 is fed to an input of the broadband receive sequencer 58.

An output of the write-enable logic is connected to line 112, which is fed to the data input, DIN, of the CRC RAM 20. The output, DOUT, of the CRC RAM is fed on line 114 to the CRC counter 18 and to an input of an RF transmit sequencer 118. The CRC counter 18 also receives a CRC detection pulse, CRCEOF, on line 120. The output of the clock selector 48 provides a clock signal CLOCK to the Ethernet receive sequencer 122, the broadband receive sequencer 58, the RF transmit sequencer 118, and the Ethernet transmit sequencer 96. The clock signal on line 67 of the Manchester decoder 64 is fed to the clock selector 48. The detection signal from the Manchester decoder on line 68 is fed to the input of the Ethernet packet strobe generator 130 (see FIG. 3) and to an input of the Ethernet receive sequencer 122. The strobe generator produces an output signal (ECSP-H) on line 132 which is fed to the write enable logic 52. When data transitions on the Ethernet are detected (as indicated by ETRCVDET), the strobe produces an output signal, SCSP—L, on line 134 which is fed to a NOR gate 136. The SCSP—L signal is the command for starting Ethernet data reception. The output of this NOR gate contains the reset signal RESET which is fed to the Ethernet receive sequencer 122, the broadband receive sequencer 58, the RF transmit sequencer 118 and the Ethernet transmit sequencer 96. A power up signal is the other input to the NOR gate 136.

The Ethernet receive sequencer 122 produces a signal, ETRCVEN, on line 138 which indicates that the Ethernet data should start to be written from the Ethernet device into the RAM buffer. This signal is fed to the write enable logic 52. The broadband receive sequencer produces a signal, RFRCVWEN, on line 140 which indicates that the RF modem data should be written from the RF modem interface into the RAM buffer. This signal is also received by the write enable logic 52. The write enable logic also receives a CRCEOF signal from the CRC detect logic 46 on line 142. This signal indicates that a CRC correct pulse has been detected.

In the timing circuitry 153, a 20 MHz oscillator 150 produces the oscillation signal, OSC, on line 100 and produces a 10 MHz signal on line 152 after passing through a divide-by-two flip-flop 154.

The two receive sequencers 58, 122 and the two transmit sequencers 96, 118 are interconnected to a field programmable logic sequencer system 160. This sequencer system produces the clock selection signals S0, S1 on lines 162 and 164, respectively, which are fed as inputs to the clock selector 48. The CBUSY signal is also fed to the FPLS system 160 along with the RFCOLLDET signal.

Figure 2A:
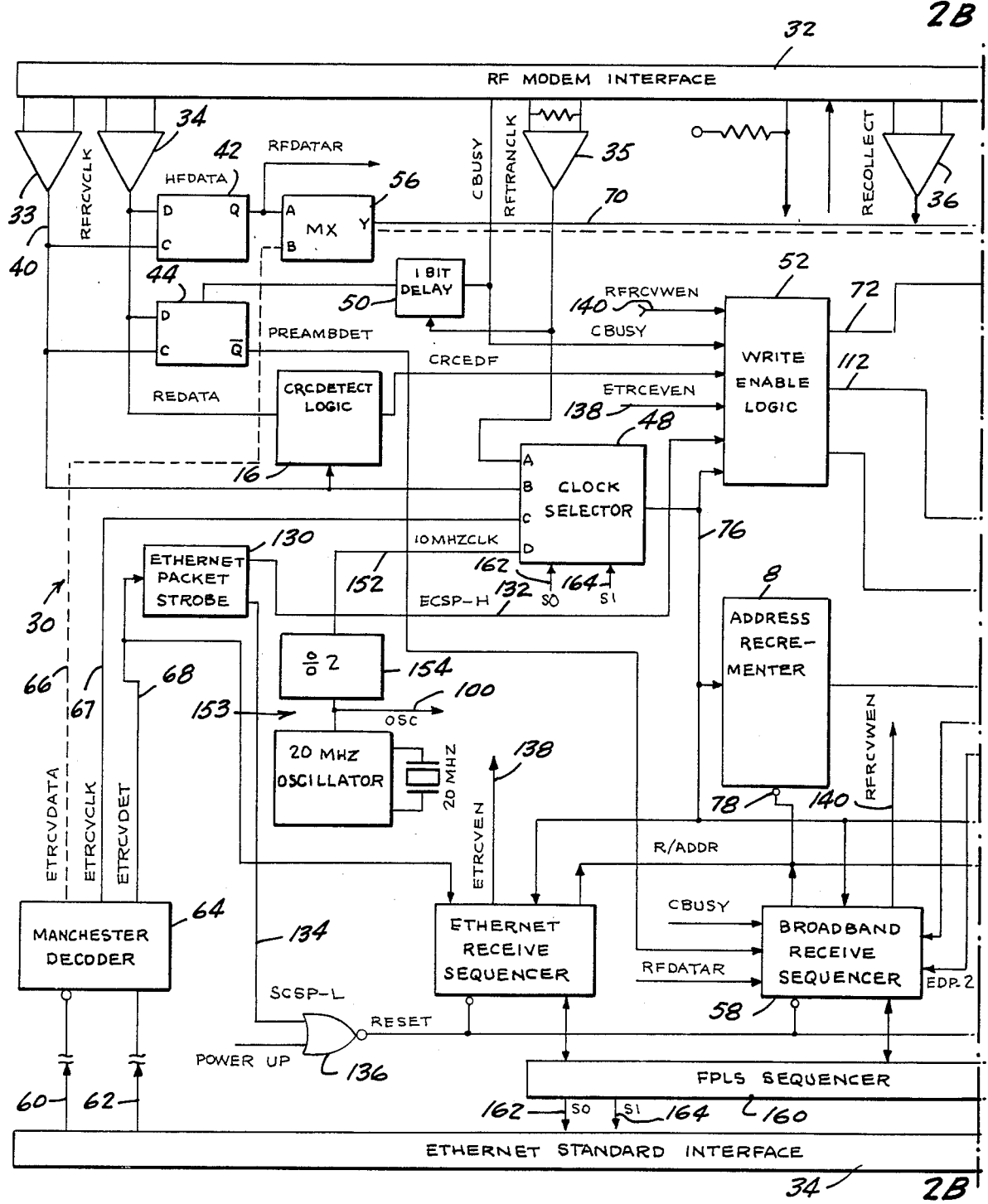
FIGS. 2A and 2B is a more detailed block diagram of the interface device of FIG. 1 for use between an RF modem interface and an Ethernet standard interface.
Figure 2B:
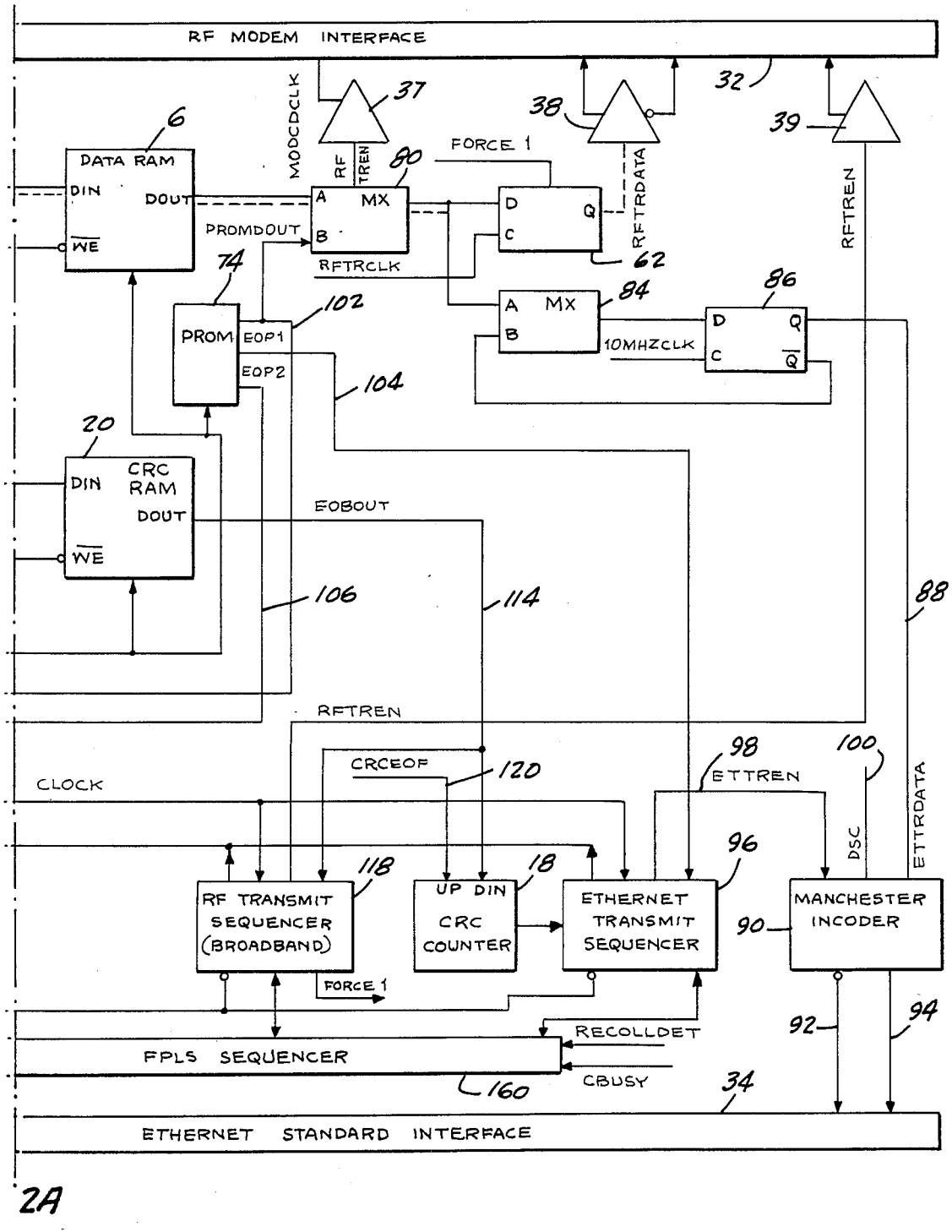
Figure 3:
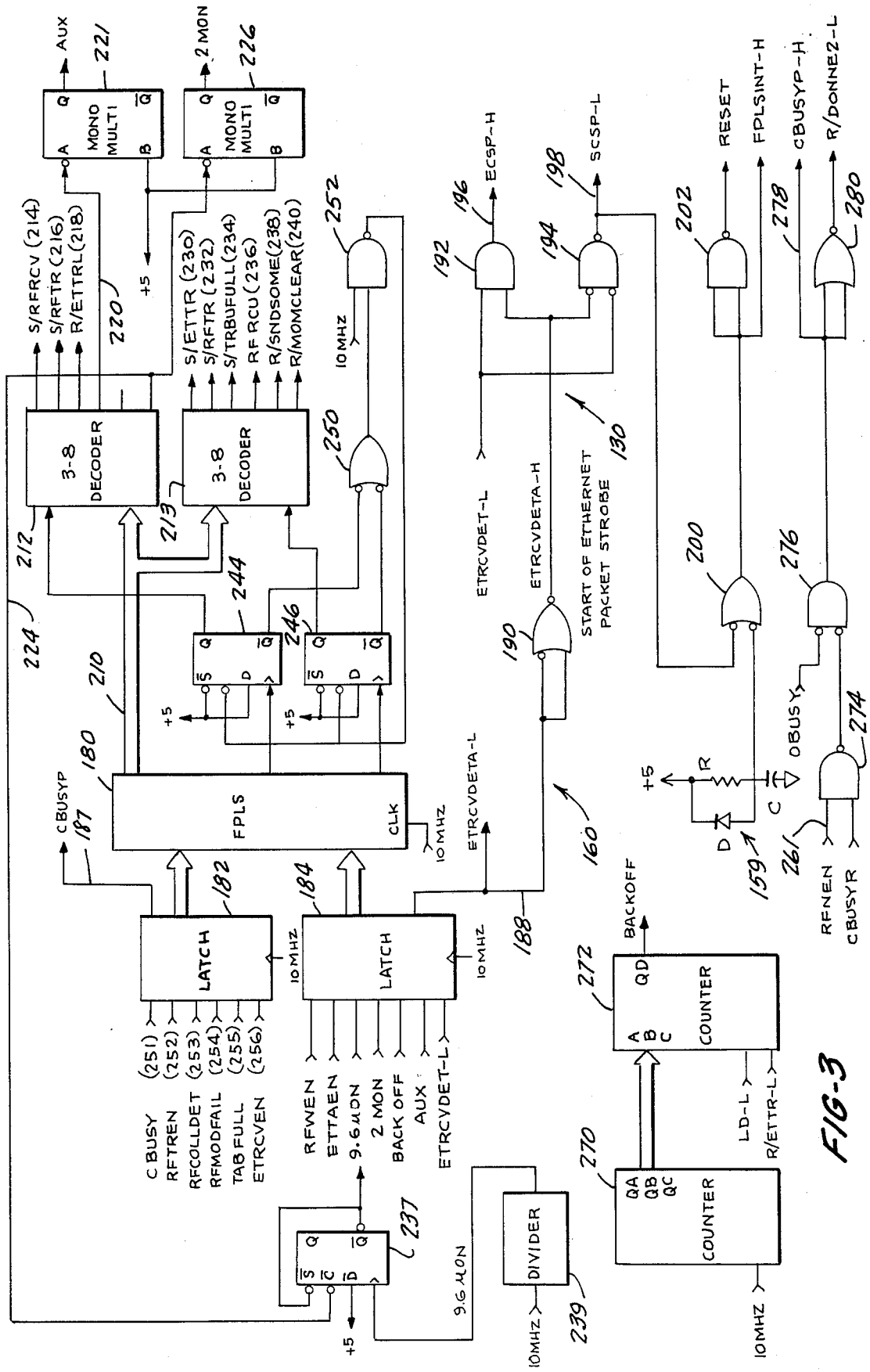
FIG. 3 is a block diagram showing the main control logic including the field programmable logic sequencer, and other supporting circuitry found in the interface device of FIG. 2.

The details of the circuitry constituting the field programmable logic sequencer system 160 is shown in FIGS. 2A and 2B as shown in FIG. 3 the heart of the system is a field programmable logic sequencer (FPLS) 180. One type of sequencer is a bipolar, programmable state-machine that is manufactured by Signetics Corporation and bears product designation No. 82S105A. The sequencer 180 receives data from a pair of latches 182 and 184. The sequencer and the two latches are clocked by a 10 MHz signal (10 MHz−). The latch also provides a CBUSYR signal on line 186. The other latch provides an ETRCVDETA−L signal on line 188. This signal is fed in its regular and active-low forms into a NOR gate 190, wired as an inverter. The output of the NOR gate produces a signal, ETRCVDETA−H, which is fed to the input of AND gate 192 and the active-low input of NAND gate 194. The Ethernet receive detect signal, ETRCVDET−L, from the Manchester decoder 64 (FIG. 2A) is fed into the other input of NAND gate 192 and the other active-low input of NOR gate 194. The output of AND gate 192, ECSP−H, marks the end of an Ethernet packet. At the same time, the NOR gate 194 has an output, SCSP−L, which marks the beginning of an Ethernet packet. This signal is inverted and fed into the active-low input of an AND gate 200 the output of which is fed to two inputs of a NAND gate 202. NAND gate 202 provides a reset signal, RESET−. The output of AND gate 200 provides a signal, FPLSINT−H, which resets the field programmable logic sequencer 180. A power-up sensing circuit 159 consisting of a diode D, capacitor C, and resistor R is used to provide a reset pulse at the output of AND gate 200.

The field programmable logic sequencer 180 produces data on lines 210 which are fed to the pair of 3-8 decoders 212 and 213. The first 3-8 decoder produces a signal on line 214 indicating that the RF receive sequence should be started. The decoder also produces a signal on line 216 which indicates that an RF transmit sequence should be started. Finally, the decoder produces a signal on line 218 which indicates that transmission from the EBLI buffer to the Ethernet device should be started. The decoder 212 also produces a signal on line 220 which activates a monostable multivibrator 221 in order to produce an AUX signal at the Q output of the device. Finally, the decoder produces a signal on line 224 which activates a monostable multivibrator 226 for producing at its Q output a 2 moN timer output signal. The signal on line 224 also provides an input signal which is fed into the $\overline{C}$ input of flip-flop 237.

Both of the monostable multivibrators 221, 226 have their B inputs connected to a +5 volt source.

Decoder 213 produces a signal on line 230 for starting the command to transmit from the buffer to the Ethernet device. The decoder produces a signal on line 232 for starting the RF transmit command.

The decoder produces another signal, RTRBUFULL, on line 234 which resets the transmit buffer full flag. A signal, RFRCV, from the decoder is produced on line 236. This signal enables the RF receive sequencer circuits. The signal, RSNDSOME, on line 238 of the decoder starts jamming the Ethernet interface to prevent the ethernet device from sending further packets while the interface device is processing the current one. Finally, the signal, RMDMCLEAR, on line 240 resets the modem failure mode.

The FPLS 180 produces clock signals to two flip-flops 244 and 246. The D and $\overline{S}$ inputs of each flip-flop are tied to a +5 voltage source. The Q output of flip-flop 244 is fed to the 3-to-8 decoder 212. The $\overline{Q}$ output of flip-flop 244 is fed into an active-low input of NOR gate 250. The Q output of flip-flop 246 is fed to the 3-to-8 decoder 213. The $\overline{Q}$ output of the same flip-flop is fed to an active low input of NOR gate 250. The output of NOR gate 250 is fed along with a 10 MHz signal into NAND gate 252. The output of this NAND gate provides the input into the $\overline{R}$ inputs of flip-flops 244 and 246. The latch 182 receives 6 signals on lines 251 through 256. The signal, CBUSY, on line 251 indicates the presence of a carrier on the RF cable. The signal, RFTREN, on line 252 turns on the RF modem transmitter. The signal, RFCOLLDET, on line 253 indicates the presence of a collision on the RF cable. The signal, RFMODFAIL, on line 254 indicates a malfunction in the modem. The signal, TRBUFULL, on line 255 indicates that the RAM buffer (data RAM 6 FIG. 4) is full and ready to transmit to the RF modem. Finally, the signal, ETRCVEN, on line 256 provides a start signal for writing Ethernet data from the Ethernet device into the RAM buffer.

Latch 184 receives 7 signals on lines 261 through 267. The signal, RFWEN, on line 261 indicates that writing data from the RF modem into RAM buffer is to begin. The signal, ETTREN, on line 262 is a start signal for transmitting information from the RAM buffer to the Ethernet interface. The signal, 9.6 uON, on line 263 is the 9.6 microsecond timer output from the flip-flop 237. The signal is derived from a 10 MHz signal that is passed through a divider 239 into the clock input of flip-flop 237. The signal, 2 moN, on line 264 is the 2 millisecond timer output from the Q output of multivibrator 226. The signal, BACK-OFF, on line 265 is the back-off time signal during a collision. The signal, AUX, on line 266 is a spare multivibrator output available for future use, if required. Finally, the signal, ETRCVDET−L, on line 267 is from the Manchester decoder. It is delayed by one clock pulse through the latch 184 to allow the receive data from the Ethernet device to stabilize. The backoff signal on line 265 is produced by a pair of counters 270 and 272 with the first counter being fed by an inverted 10 MHz signal and the other counter being fed by a random number used to calculate the backoff time and a signal, RETTR−L, for incrementing the counter 272.

The RFWEN signal from line 261 is also fed into a NAND gate 274. The other input of the NAND gate receives the CBUSYR 186 signal from latch 182. The output of the NAND gate is fed into an active-low input AND gate 276. The CBUSY signal from line 251 is fed into the other active-low input of the same AND gate. The output of this AND gate provides a CBUSYP−H pulse on line 278. The output of AND gate 276 is also fed to the two inputs of NOR gate 280 which at its output produces an RF receive completed signal, RDONNE2−L, which indicates that a packet has been successfully received in the buffer.

A detailed diagram of the circuitry associated with the address incrementer 8 is shown in FIG. 4. The write-enable logic 52 is shown in FIG. 4 as consisting of a series of logic gates. The first set of logic gates 52-1 that receives the ETRCVEN, ENDPLS, and RFWEN signals produces the $\overline{WE}$ signal for the data RAM 6 on line 281. The series of logic gates 52-2 which receive the ECSP−H, ETRCVEN, ENDPLS, RFWEN, CBUSYR−H, ECSP−H, and CRCEOF−L signals produces the $\overline{WE}$ signal for the CRC RAM 20 on line 283. The clock selector 48 is in the form of a multiplexer which selects one of four possible data and clock combinations: ETRCVCLK and NO DATA; 10 MHz and MUXDATA; RFRCVCLK and ETTRDATA; and RFTRCLK and ETTRDATA. The multiplexer produces as an output signal, OUTDATA, on line 280 as either MUXDATA or a sequence of 1's and 0's for an Ethernet jam pattern. The choice of data is selected by the S0 and S1 signals generated by the FPLS. The OUTDATA is fed into the D input of flip-flop 86, which at its Q output produces the Ethernet transmission data signal, ETTRDATA, and at its $\overline{Q}$ output produces the inverse of that signal, ETTRDATA−L. The multiplexer 48 also produces the COMBCLK signal on line 282 which tells the address incrementer which of the four clocks has been selected by the S0 and S1 signals. The COMBCLK signal is passed through a delay line 284 to yield the ENDPLS signal which is indicative of the middle of the clock set. An AND gate 286 followed by an inverter 288 produces a reset address signal, R/ADDR−, on line 290 based on the RF and Ethernet reset signals transmitted from elsewhere in the respective sequencers.

Figure 6:
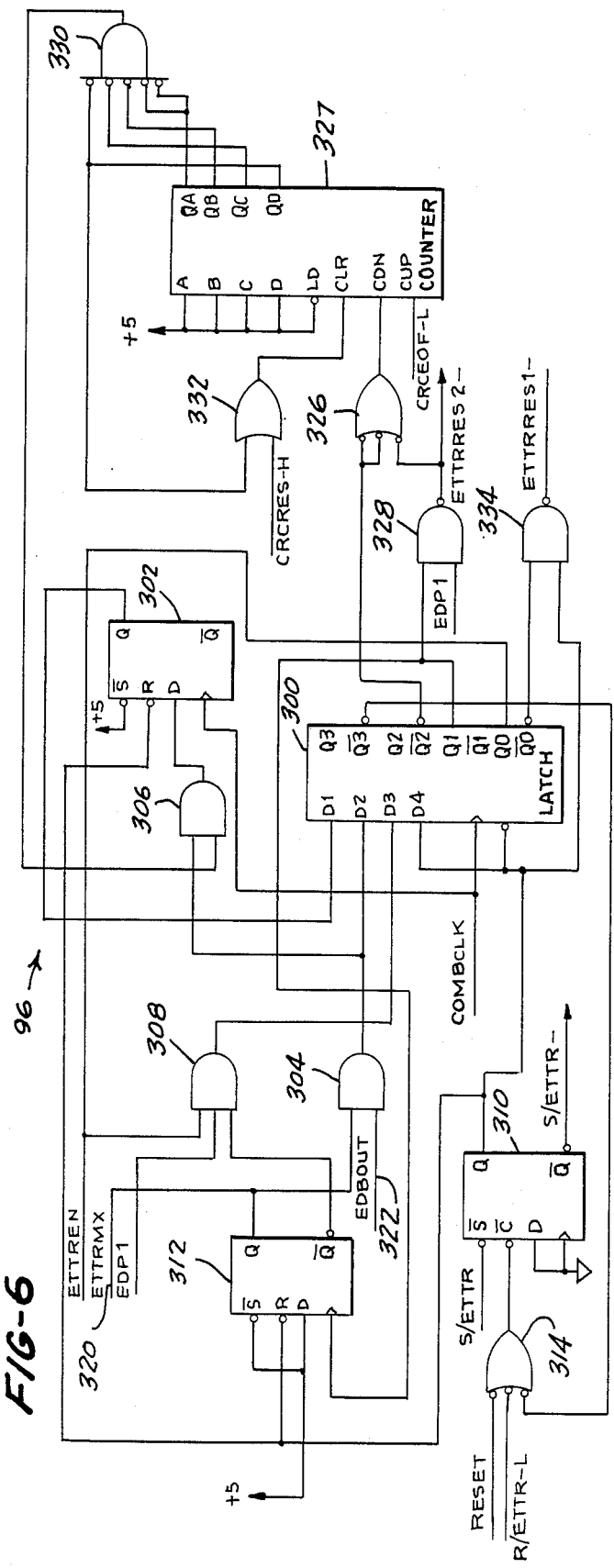
FIG. 6 is a logic block diagram of the Ethernet transmit sequencer of FIG. 2.

FIG. 6 shows the details of the Ethernet transmit sequencer 90. The purpose of this sequencer is to provide the correct timing signals to reconstruct the preamble and transmit the buffered packet to the ethernet. The Ethernet transmit sequencer includes a quad flip-flop configured as a latch 300 which receives the COMBCLK as a timing signal. The D1 input receives the Q output of flip-flop 302. The D2 input is received from the output of an AND gate 304. This AND gate receives the Q output of flip-flop 312 and the data (EOBOUT) from the CRC RAM 20. The output of this AND gate also provides an input to AND gate 306 which in turn provides the D input to D flip-flop 302. The D3 input to the latch 300 comes from the output of AND gate 308. Finally, the D4 input of the quad flip-flop is derived from the Q output of flip-flop 310. This output provides the reset for the quad flip-flop and further flip-flops 302 and 312. The $\overline{Q3}$ output of the latch 300 is fed into an active-low input of NOR gate 314. This NOR gate has two other active-low inputs which receive the reset signal, RESET−, and the Ethernet transmit reset state signal, RETTR−L. The output of NOR gate 314 provides the $\overline{C}$ input to flip-flop 310. The $\overline{Q}$ output of flip-flop 310 provides a signal, SETTR−, which is the command from the FPLS to begin transmission from the buffer to the Ethernet device.

The Q output of flip-flop 312 provides the ETTRMX signal on line 320. The signal, which switches the OUTDATA from preamble to RAM data, is also fed into one of the inputs of AND gate 304. The other input of AND gate 304 receives the EOBOUT signal on line 322. The $\overline{Q}$ output of flip-flop 312 is fed into AND gate 308. The same AND gate also receives the EOP1 signal as well as the ETTREN signal.

The $\overline{Q2}$ output of the latch 300 is inverted and fed into an active-low input of NOR gate 326. The Q1 output of the quad flip-flop provides the timing signal to flip-flop 312 and also an input to NAND gate 328. This NAND gate also has an input for the EOP1 signal. The output of this NAND gate which is an address counter reset signal is fed to the final active-low input of NOR gate 326. The output of NOR gate 326 provides a count down signal to counter 327 which is actually CRC counter 18 from FIG. 1.

The CRCEOF-L signals provides a count-up signal to the counter. The counter provides four outputs QA through QD, which are fed to the active-low inputs of AND gate 330. The output of this AND gate provides the final input to AND gate 306. The QD output of the counter is fed to an input of OR gate 332. The other input of the OR gate receives a CRCRES-H signal for resetting the CRC detection logic 16 and the CRC counter 18. The output of the OR gate 332 provides a clear signal, CLR, to the counter 327. The $\overline{Q0}$ output of the quad flip-flop is inverted and provides an input to NAND gate 334. This NAND gate also receives the Q output of flip-flop 310. The output of NAND gate 334 is an address counter reset signal which is fed to an AND gate 286 (FIG. 4).

Figure 7:
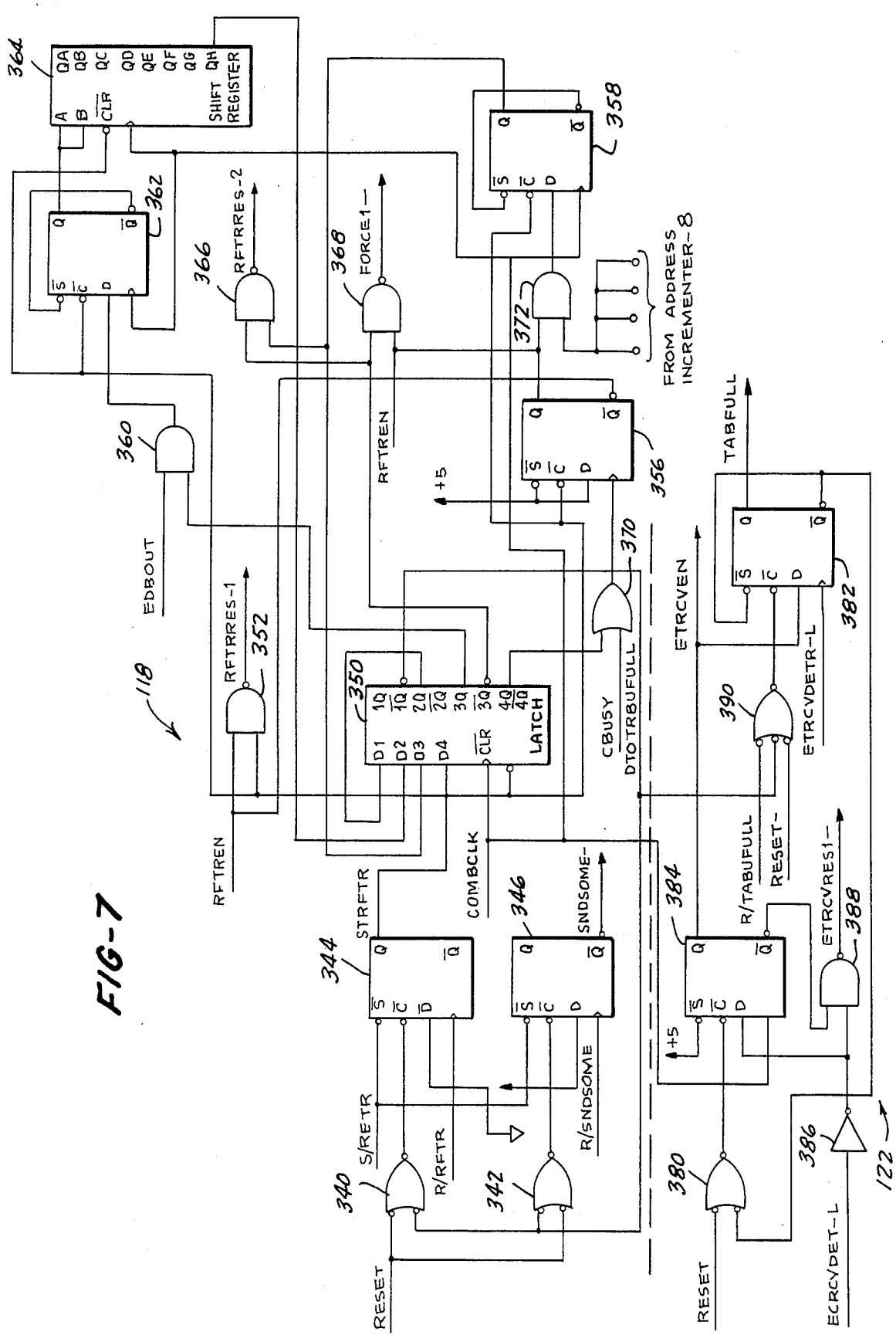
FIG. 7 is a logic block diagram of the RF transmit sequencer and Ethernet receive sequencer of FIG. 2.

Both the RF transmit sequencer 118 and the Ethernet receive sequencer 122 are shown in FIG. 7. The dotted line 337 functionally separates the RF transmit sequencer from the Ethernet receive sequencer in FIG. 7.

Taking the RF transmit sequence first, two NOR gates 340 and 342 receive at their active-low inputs a reset signal, RESET−. The other active-low inputs of NOR gates 340 and 342 receive the $\overline{1Q}$ of the quad flip-flop. The outputs of the NOR gates 340 and 342 are each, respectively fed to the $\overline{C}$ inputs of flip-flops 344 and 346. The $\overline{S}$ inputs of these flip-flops receive the S/RFTR− signal which is the command to start RF receiving. Flip-flop 334 receives as its clock signal the R/RFTR signal and the flip-flop 346 receives as its clock signal the R/SNDSOME signal. This signal resets flip-flop 346 and start the jam signal, SNDSOME−, to the ETHERNET. The Q output of flip-flop 344 is an S/RFTR signal which is fed into the D4 input of the quad flip-flop configured as a latch 350. The SRFTR signal, which is the command for starting RF transmissions, provides a not clear signal, $\overline{CLR}$, to the latch 350, as well as an input to NAND gate 352 and the $\overline{C}$ input to two flip-flops 356 and 358.

The $\overline{1Q}$ of latch 350 is inverted and provides the OTOTRBUFULL signal as the second active-low input to NOR gates 340 and 342. The OTOTRBUFULL signal resets the RF transmit logic and the transmit buffer full flag. The signal indicates that a packet was successfully transmitted to the RF cable. The 2Q output of the quad flip-flop is fed back as the D1 input. The 3Q output provides the input to AND gate 360. The other input to AND gate 360 is the EOBOUT signal which is the output from the CRCRAM and thus indicates when end of packet occurs. The output of AND gate 360 provides the D input to flip-flop 362. The COMBCLK signal provides a clocking pulse to flip-flops 350, 356, 358 and 362 and shift register 364. The $\overline{Q}$ output of flip-flop 362 provides the $\overline{S}$ input of flip-flop 362 which latches it at end of packet. The Q output of the flip-flop provides the serial data input to shift register 364. The QH output of the shift register provides the D2 input to the latch 350 effectively delaying the end of packet to the broadband medium by 8 clock times. The 3Q output of the quad flip-flop provides an input to two NAND gates 366 and 368. The NAND gate 366 receives the Q output of flip-flop 358, which goes TRUE as soon as broadband transmission commences, while the NAND gate 368 receives the Q output of flip-flop 356, which goes TRUE only after the preceding "1" bits (from 32 to 1024 of them) have been transmitted. The output of flip-flop 366 provides an address counter reset signal and the output of NAND gate 368 provides a FORCE1− signal which forces the broadband transmit section to transmit all "1" bits. NAND gate 368 also requires the RFTREN signal.

The 4Q output of latch 350 is fed to OR gate 370 which also receives the CBUSY signal. The output of this OR gate which indicates that either the device just took control of the cable, or that it was already busy, provides the clock pulse to flip-flop 356. The Q output of this flip-flop is fed to AND gate 372 which provides the D input to flip-flop 358. The AND gate 372 also has an input which is derived from the address incrementer. It goes TRUE when either 32, 64, 128, or 1024 bits have been transmitted and is the signal to stop sending the synchronization preamble (i.e., turn off FORCE1). The remaining portion of FIG. 7 deals with the Ethernet receive sequencer 122. A NOR gate 380 receives the reset signal, RESET−, which occurs at the beginning of a packet received from the Ethernet, and also the Q output of flip-flop 382. The output of the NOR gate is fed into the $\overline{C}$ input of flip-flop 384. The $\overline{S}$ input of the flip-flop receives a +5 volt signal. The ETRCVDET-L signal, which is generated by the Manchester decoder 64 in response to receive data detected from the Ethernet device, passes through an inverter 386 and then into NAND gate 388. The output of the inverter 386 also provides the D input into flip-flop 384. The $\overline{Q}$ output of flip-flop 384 is inverted and fed into the NAND gate 388 which produces at its output an address counter reset signal. A NOR gate 390 receives at its active-low inputs, the OTOTRBUFULL signal along with the R/TRBUFULL and reset signal, RESET−. The output of NOR gate 390 is passed to the $\overline{C}$ input of flip-flop 382. The Q output of flip-flop 384 provides the D input to flip-flop 382. The $\overline{Q}$ output of flip-flop 382 provides the $\overline{S}$ input to the same flip-flop. The Q output of flip-flop 382 provides the TRBUFULL signal on line 392. This signal indicates that the transmit buffer is full and is ready to transmit to the RF modem.

Figure 8:
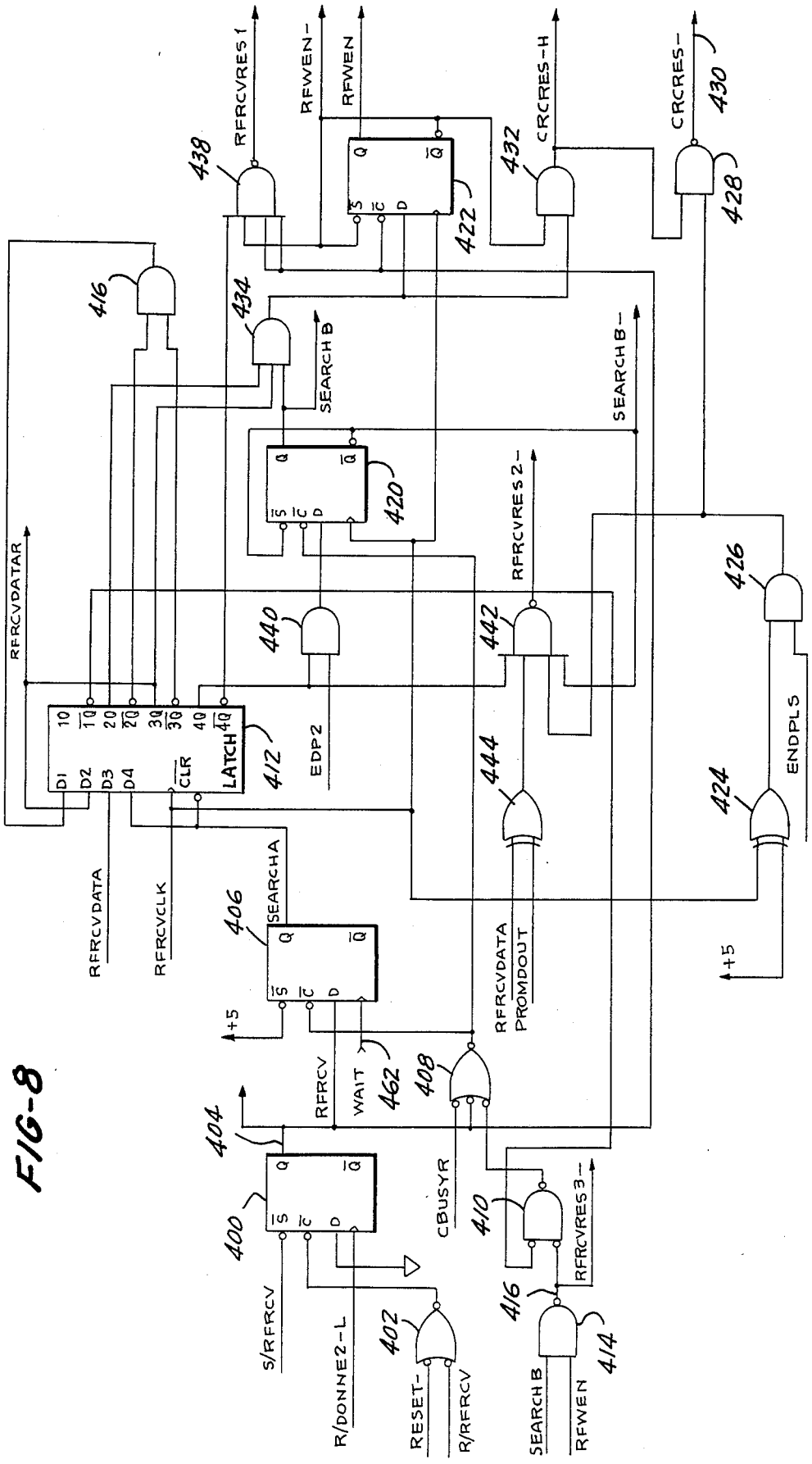
FIG. 8 is a logic block diagram of the broadband receive sequencer of FIG. 2.

FIG. 8 shows the broad band receiver sequencer 58. A flip-flop 400 has as its $\overline{S}$ input the S/RFRCV signal, which is the command for starting RF receiving. The $\overline{C}$ input of the flip-flop is derived from the output of NOR gate 402 which has as its input the reset signal, RESET−, and the R/RFRCV signal, which resets the RF receive state. The D input of flip-flop 400 is grounded. The Q output of flip-flop 400 provides the RFRCV signal indicating that the receiver is searching for a packet to be received on line 404. This signal provides the D input to flip-flop 406. The $\overline{S}$ input of this flip-flop is connected to a +5 volt source and the $\overline{C}$ input is derived from the output of NOR gate 408 which resets flip-flop 406 on beginning of packet or if the receive sequence is aborted. This NOR gate receives the CBUSYR signal, the RFRCV signal and the output of NAND gate 410. This NAND gate is fed by the $\overline{1Q}$ output of a quad flip-flop configured as a latch 412. The NAND gate 410 is also fed by the output of NAND gate 414 which produces an address counter reset signal on line 416. NAND gate 414 receives the SEARCHB signal and the RFWEN signal such that it goes low, resetting SEARCHA when valid packet data begins. The Q output of flip-flop 406 provides the SEARCHA signal to the D4 input of the latch 412 and also provides the $\overline{\text{clear}}$ signal to the same latch. The SEARCHA signal signifies searching for the beginning of the Ethernet preamble, whereas the SEARCHB signal signifies searching for the end of the Ethernet preamble.

The D1 input to the latch 412 is derived from the output of AND gate 416 which has as its input the output from the $\overline{2Q}$ and $\overline{3Q}$ outputs of the latch 412. The D3 input to flip-flop 412 is the RFRCVDATA signal. The RFRCVCLK signal provides the clock signal to latch 412, flip-flop 420, and flip-flop 422. It also provides an input to the exclusive OR gate 424 which inverts the clock for use by AND gate 426. The output of the exclusive OR gate 424 combines with the ENDPLS signal as inputs to AND gate 426. The output of AND gate 426 is an input to NAND gate 428 in order to produce the CRCRES signal on line 430. As stated before, the CRCRES signal resets the CRC detect logic and the CRC counter. The other input to NAND gate 428 is the output of AND gate 432 which indicates the sequencer wants to reset the CRC detect logic.

The 2Q and 3Q outputs of latch 412 are fed to the input of AND gate 434. The Q output of flip-flop 420 provides the other input to AND gate 434. The output of this AND gate, which signifies that the packet is actually present from the broadband receiver, provides an input to AND gate 432 as well as the D input to flip-flop 422. The RFRCV signal provides the $\overline{C}$ input to flip-flop 422 and an input to NAND gate 438. The $\overline{Q}$ output of flip-flop 422, which indicates that the band should accept the broadband received data into its buffer, provides the $\overline{S}$ input to flip-flop 422 and an input to NAND gate 438. The $\overline{4Q}$ output of latch 412 provides the final input to NAND gate 438. The output signal from NAND gate 438 is a signal which resets the address incrementer at the beginning of the real broadband packet.

The 4Q output of latch 412 is an input to AND gate 440 which has as its other input the EOP2 signal, which signifies that enough valid data has been recognized to be considered a valid Ethernet preamble. The output of AND gate 440 provides the D input to flip-flop 420. The $\overline{Q}$ output of flip-flop 420 provides the $\overline{S}$ input for the same flip-flop latching its state. The 4Q output of latch 412 is also an input to NAND gate 442. The output of exclusive OR gate 444, which is in TRUE state when the received data is not the same as a valid preamble would be, is another input to NAND gate 442. Likewise, the $\overline{Q}$ output of flip-flop 420 is an input to NAND gate 442. Finally, the output of AND gate 426 provides the last input to NAND gate 442 which has as its output a further address counter reset signal. This reset goes TRUE when the data is invalid to be considered part of a packet preamble. The exclusive OR gate 444 has as its input the RFRCVDATA signal and the PROMDOUT signals. The RFRCVDATA is the RF received data, delayed by one clock, and the PROMDOUT is the Ethernet preamble.

Figure 9:
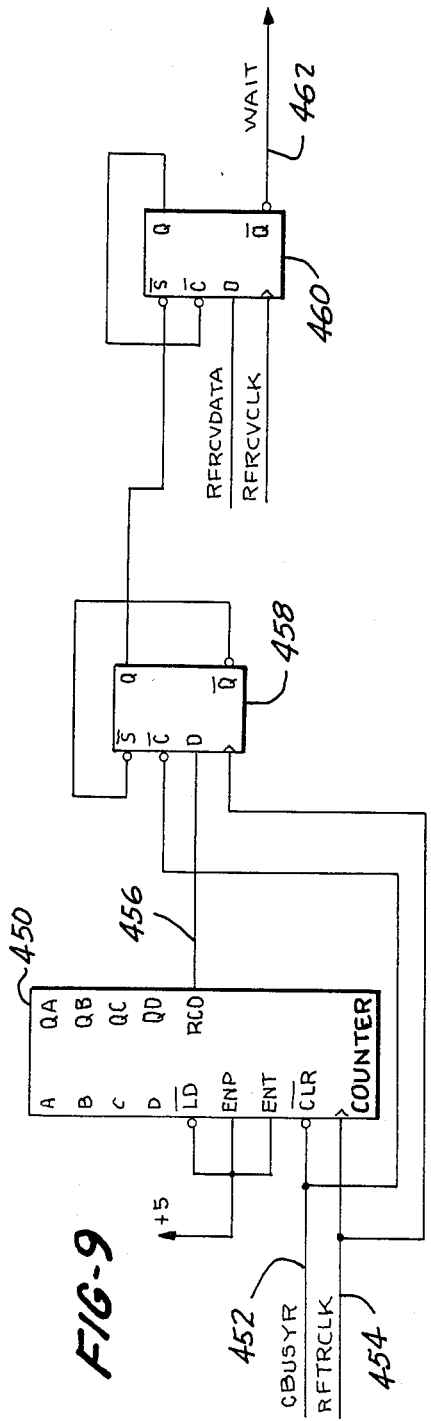
FIG. 9 is a logic block diagram the wait signal circuitry.

FIG. 9 shows the circuitry for producing the wait signal used in conjunction with the broadband receive sequencer. A counter 450 which receives the CBUSYR (broadband receive data present) signal on line 452 and the RFTRCLK signal on line 454 produces at its RCO (arithmetic Ripple Carry Out) output on line 456 the D input of flip-flop 458. The $\bar{Q}$ output of the flip-flop provides the $\bar{S}$ input to the same flip-flop and the $\bar{C}$ input for that flip-flop is the CBUSYR signal. The Q output of the flip-flop, which is TRUE starting 17 cycles of RFTRCLK after the broadband carrier becomes active (CBUSYR), provides the $\bar{S}$ input to flip-flop 460. The Q output of flip-flop 460 provides the $\bar{C}$ input to the same flip-flop. The D input to the flip-flop is the RFRCVDATA signal whereas the clock signal is the RFRCVCLK signal. The $\bar{Q}$ output of the flip-flop provides the WAIT signal on line 462 as the clock input to flip-flop 406 (FIG. 8). The result is that WAIT (line 462) will become true on the first zero bit following the 17th bit of the packet.

Figure 5A:
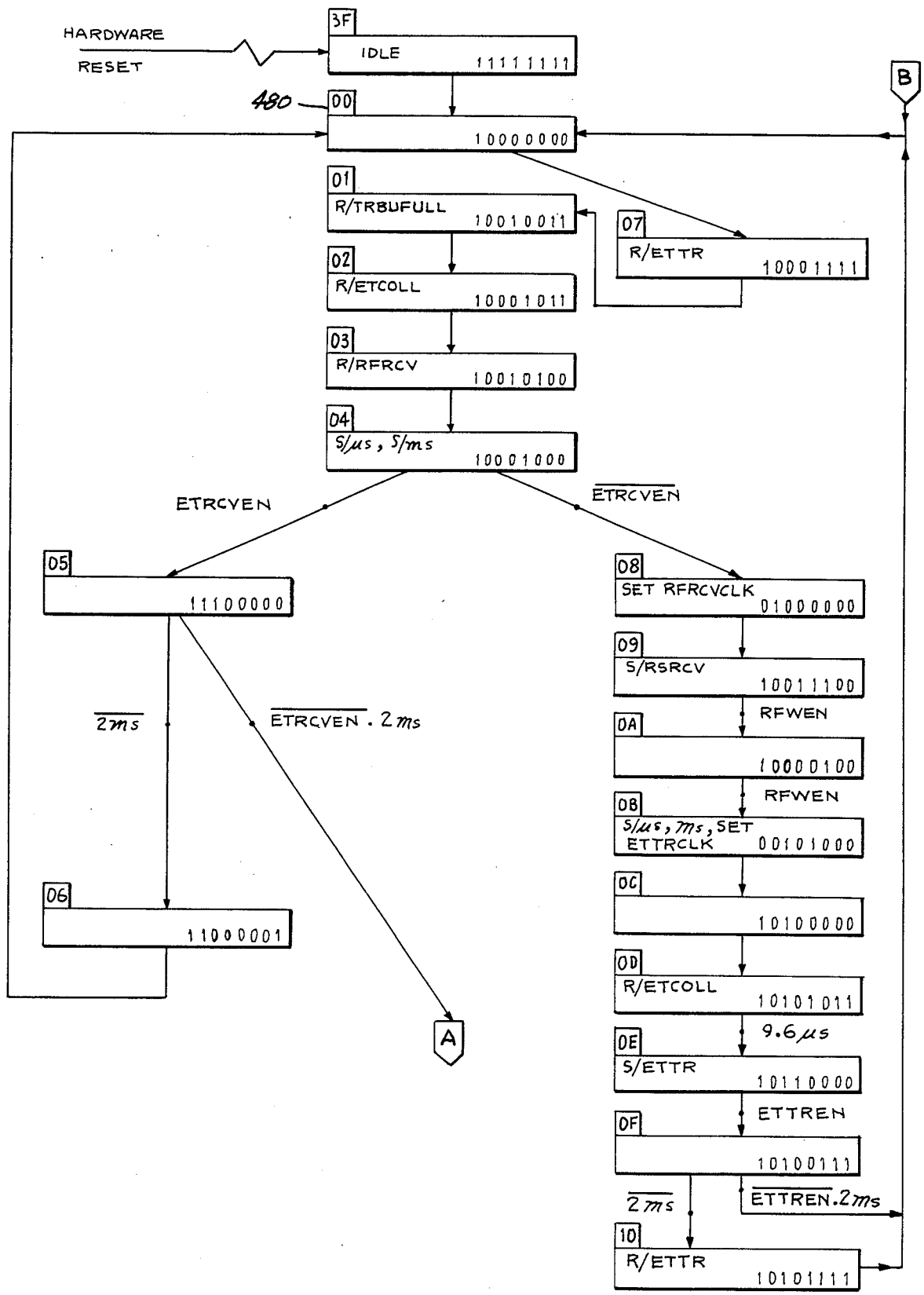
FIGS. 5A and 5B is a flow diagram of the field programmable logic sequencer states.
Figure 5B:
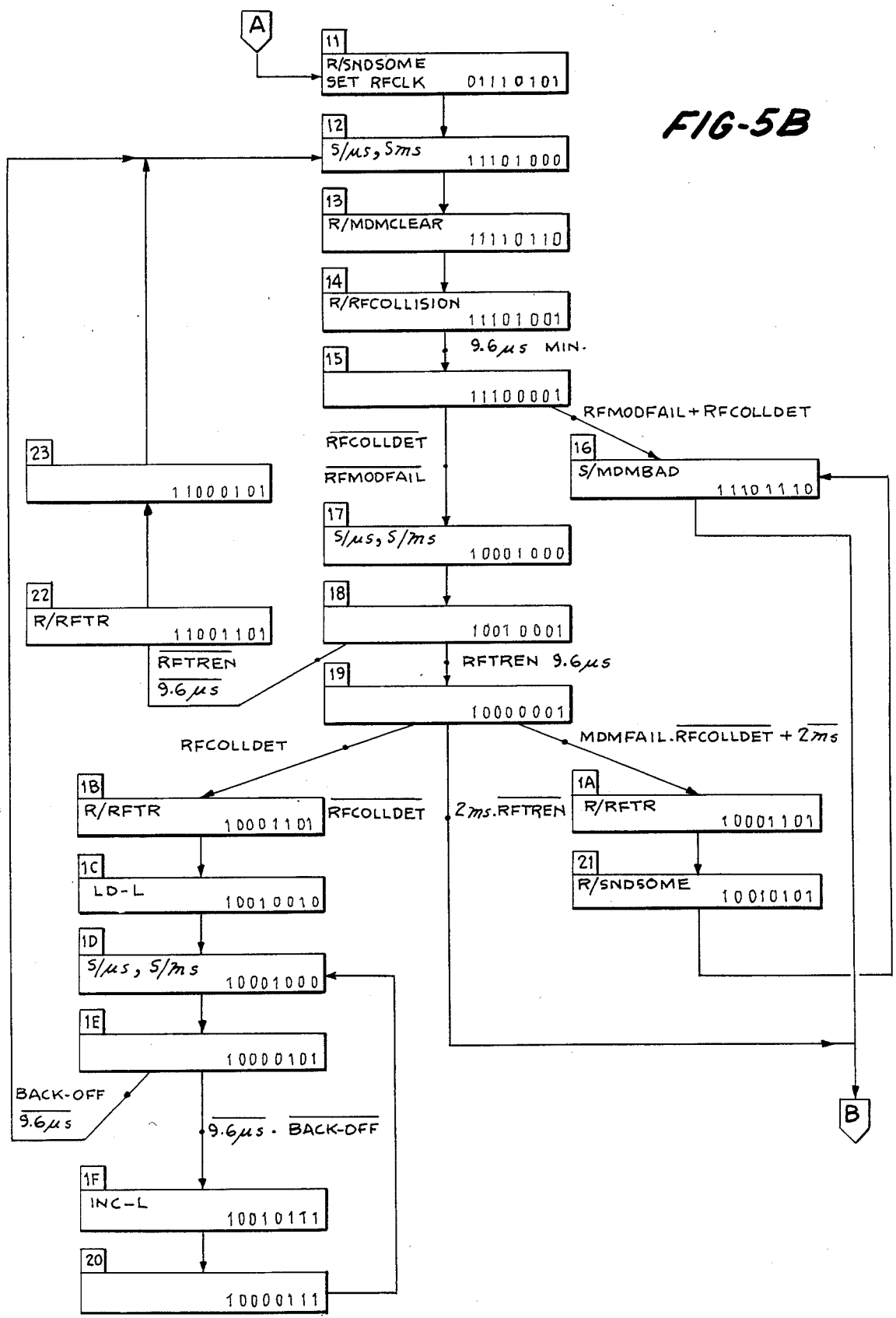

The operation of the field programmable logic sequencer 180 is presented in Table 1 which shows the FPLS state description when read in light of the flow diagram shown in FIGS. 5A and 5B. As shown in FIG. 5A, the state number is presented in block 480. For example, the state number 00 indicates the basic return state. The state number 01 says that the R/TRBUFULL signal should be asserted, which in turn resets the transmit buffer full flag. Through the use of the state description as presented in Table 1, in the flow diagram presented in FIGS. 5A and 5B, the sequential operation of the FPLS is evident.

TABLE I

| | FPLS State Description |
|---|---|
| 00 | Basic return state |
| 01 | Assert R/TRBUFULL |
| 02 | Assert R/ETCOLL |
| 03 | Assert R/RFRCV - Clear RF receive mode if not |
| 04 | Start two timers |
| 05 | Currently receiving Ethernet data |
| 06 | Ethernet receive timed out |
| 07 | Clear Ethernet transmission |
| 08 | Make COMBCLK = RFRCVCLK via S0, S1 |
| 09 | Start possible RF receive sequence (default or idle state) |
| 0A | Actually receiving RF data |
| 0B | Set timers, COMBCLK = 10 MHz For Ethernet transmit |
| 0C | No-op |
| 0D | Reset possible Ethernet collision via R/ETCOLL (defunct) |
| 0E | Start Ethernet transmission via S/ETTR |
| 0F | In Ethernet transmission |
| 10 | Ethernet transmission timeout - reset transmission via R/ETTR |
| 11 | Set COMBCLK = RFTRCLK, Stop Ethernet jam (not needed) |
| 12 | Start timers |
| 13 | MODEM Clear Fail Assertion |
| 14 | Reset RF collision conditions |
| 15 | Come here after 9.6 usec RF interpacket gap times out |
| 16 | Modem has filed - Assert S/MDMBAD |

TABLE I-continued

| | FPLS State Description |
|---|---|
| 17 | Modem OK, restart timers |
| 18 | Try to get RF cable |
| 19 | Got cable - RF transmission in progress |
| 1A | Modem failed - Stop RF transmission |
| 1B | Collision - Stop RF transmission |
| 1C | Load Backoff timer |
| 1D | Set timers again |
| 1E | Wait here until the 9.6 usec timer times out - go back to 12 if finished Backoff count |
| 1F | Increment Backoff counter |
| 20 | Do nothing |
| 21 | Stop Ethernet jam |
| 22 | Couldn't get cable, stop trying |
| 23 | Do nothing, go to state 12 |

Having described the details of the circuitry constituting the interface device, an explanation of the operation of the device is now presented. The inventive interface device operates sequentially through four states: Baseband Receive, Broadband Transmit, Broadband Receive, and Baseband Transmit,.

With reference to FIG. 2A, the Broadband Receive state is activated, when the cable-busy signal, CBUSY, activates the field-programmable logic sequencer 160 to pass signals S0 and S1 on lines 162 and 164, respectively, to control the clock selector 48 and other portions of the interface device, and to initiate the Broadband Receiver sequencer 58.

Since an incoming data packet has a preamble which consists of a number of consecutive "1" bits plus at least 64-bits of consecutive alternating "1's" and "0's", provision must be made to synchronize the data receive sequencer with the incoming packet. Thus, the first sixteen bits of the incoming signal, which may include spurious inconsistencies, are allowed to pass without registering in the system except in the 17-bit delay 50. After the passage of the first 17 bits, the delay unit 50 activates the flip-flop 44 to pass the incoming data stream to the broadband receive sequencer 58 starting with the first "0" bit. Logic associated with the flip-flop 44 examines the incoming packet, which, under the assumed transmission protocol, begins with a series of "1's", waiting for a shift to a "0" which marks the beginning of the 64-bit preamble. When a zero occurs, the flip-flop 44 passes a signal to the sequencer 8 which resets the address incrementer 8 to begin reading simultaneously from three registers in the PROM 74. The first register consists of a "0" followed by a series of "1's" corresponding to the 64-bit preamble length as the signal EOP2 on line 106 which, when received at the sequencer 58, indicates that enough valid data has been received on the broadband interface to be considered a valid preamble and activates a jam signal on the baseband interface 34 to prevent interference with the broadband receive operation. This signal is also passed to the sequencer 58 and activates the write-enable logic 52 to pass write-enable signals to permit message data to be recorded in the data RAM 6 and in the CRC RAM 20.

The second register in the PROM 74 sends the signal PROMDOUT on line 102 which consists of a longer series of "0's" corresponding to the 64-bit length of the preamble. The third register, which creates signal EOP1, is described later.

The sequencer 58, also at the end of the preamble, resets the CRC-detect logic 16 which then begins conventional CRC calculations starting with the fi st bit of the arriving data. The sequencer also passes zeroes through the write-enable logic 52 for storage in the CRC RAM 20 concurrently with corresponding data bits being stored in the data RAM 6. This continues unless and until a CRC calculation should have a positive result, in which case a "1" is stored in the position in the CRC RAM 20 which corresponds to the position in the data RAM 6, of the bit in the data packet which was the cause of the positive CRC calculation. Each CRC positive calculation, and there may be more than one, increments the CRC counter 18.

When the cable busy signal, CBUSY, goes inactive, the write-enable logic 52 cuts off the enabling signal to the data RAM and the CRC RAM, and the FPLS 160 changes the signals S0 and S1 to begin the Baseband Transmit sequence.

As noted previously, the process of ending the cable-busy signal involves a damping-down of the carrier wave as a result of which an unpredictable pattern of "dribble" bits may be recorded in the data RAM 6 at the end of the packet data, before the write-enable signal ends. However, the number of "1" bits stored in CRC RAM 20 should be exactly the same as the count reached by CRC counter 18, and the final one should occur at the real end of the packet.

With reference to FIG. 3, and with continued reference to FIGS. 2A and 2B, as the cable-busy signal, CBUSY, goes inactive the FPLS sequencer 160 changes the control signals S0 and S1 to select the oscillator controlled Baseband Transmit clock signal, 10 MHz, in the clock selector 48 for control of the system timing. It also simultaneously ends the jam signal which has prevented activity on the baseband medium 34 during the Broadband Receive sequence, initiates the Ethernet or baseband transmit sequencer 96, and resets counter 270 within the FPLS system 160. The counter 272 records 960 of the 10 MHz clock pulses, marking 9.6 microseconds which is the required minimum interpacket gap. This assures that devices on the baseband side of the device will be able to receive baseband transmission. The counter then immediately signals the sequencer 96 to activate the enabling signal, ETTREN, to begin the sending process for the data just received from the broadband network (RF modem interface) 32.

No other baseband device can be ready to begin transmission of data as quickly after the ending of the jam signal and therefore the CSMA/CD system prevents the Broadband-Receive Baseband-Transmit sequence from being interrupted.

At the same time as the start of the transmit-enable signal, ETTREN, the sequencer 96 sets the multiplexer 80 open to data from the PROM 74, and resets the address incrementer 8 to begin passing packet preamble data from the PROM 74 through the multiplexers 80 and 84 and the flip-flop 86 into the Manchester encoder 90, and thence into the baseband medium, which in a preferred embodiment is the Ethernet standard interface 34, and thus to its intended receiving device. When the preamble, a 64 bit transmission of alternating 1's and 0's, has finished, an end-of-preamble signal, EOP1, which is the third register in PROM 74, is passed to the Ethernet transmit sequencer 96. This activates a reset signal, R/ADDR, which restarts the address incrementer 8 and changes the multiplexer 80 to close off the flow of preamble data and to enable the flow of message data from the data RAM 6, which reads out under control of the address incrementer 8.

Also at the end of the preamble, another signal from the sequencer 96 activates the CRC detect logic 16 to receive data, also flowing under control of the incrementer 8, from the CRC RAM 20. Every time detect logic 16 recognizes a correct computed CRC, it provides a signal CRCEOF, which decrements the count in the CRC counter 18.

The message data continues to flow out of the data RAM 6, via intermediate structures 80, 84, etc., through the Manchester encoder 90 into the baseband medium 34. When the count in the CRC counter 18 is decremented to zero, the end of the message is identified. The Ethernet transmit sequencer 96, recognizing the zero count signal from the counter 18, immediately disables the transmission enabling signal, ETTREN, thereby abruptly stopping the transmitting encoder 90 just after the last bit of message data, and before any of the "dribble" bits could be transmitted.

Thus, it may be seen that a data packet arriving at interface device from the broadband medium 32 ma be stripped of the 37 dribble" bits associated with it, for transmission into the baseband medium 34.

In Baseband Receive state, as illustrated in FIGS. 2A and 2B a data packet arriving over the baseband medium 34 enters the receiving or Manchester decoder 64, which outputs three signals on lines 66-68.

The first signal, ETRCVDET, is a detection signal, which is passed both directly to the baseband receive sequencer 122 and, via the detection circuit 130, to the FPLS system 160. The second signal, ETRCVCLK, is a clock signal which is passed to the clock selector 48. The third signal, ETRCVDATA, from the receiving decoder 64 is the data stream, which is passed via the multiplexer 56 to the data RAM 6.

When activated by the detection signal, ETRCVDET, the FPLS 180 changes the signals S0 and S1 to enable the clock selector 48 to receive the clock signal, ETRCVCLK, which is then distributed throughout the interface device system. These signals also initiate the baseband receive sequencer 122.

The baseband or Ethernet receive sequencer 122 sends a receive-enable signal, ETRCVEN on line 138, to the write-enable logic 52 to enable the data RAM 6 to write the message data, and to enable the CRC RAM 20 to write marking bits which correspond to the spaced occupied in the data RAM 6 by the actual packet data. These message writing and space marking processes continue as long as the detection signal, ETRCVDET, is received at the detection circuit 130, but at the end of the data packet, the detection signal on line 68 also ends. At that point the detection circuit 130 signals the write-enable logic module 52 which then disables the data RAM 6 and passes a marker signal to be recorded in the CRC RAM 20 in the address which corresponds to the address occupied in the data RAM 6 by the last bit of the data packet. Then the Ethernet receive sequencer 122, noting the end of the detection signal, passes a signal to the FPLS 160 to shift to the Broadband Transmit state.

As shown in FIG. 3, a signal from the Ethernet receive sequencer 122 (ETRCVEN) causes the FPLS 180 to pass signals S0 and S1 which open the clock selector 48 in FIG. 2A to the continuous clock signal coming from the modem over the differential line receiver 35, so that the modem clock signal governs the interface system. These signals also cause the broadband transmit sequencer 118 to initiate its sequence of activities.

The first activity is to cause a synchronization signal to be output onto the broadband medium 32. Thus, a timed signal, FORCE1, constituting a series of "1"s is sent through the flip-flop 82 and the driver 38 to the broadband modem interface 32. At the same time the broadband transmit sequencer 118 has confirmed from the collision detector within the modem that the broadband medium, via modem interface 32, was free to receive transmissions and has passed a transmittable message, RFTREN, to the driver 39.

When the prescribed time for the transmission of the synchronization message has ended, the RF transmit sequencer 118 activates the multiplexer 80 to select the data path from the RAM 6 and initiates the address incrementer 8 to begin driving the packet data out of the RAM 6 through the multiplexer 80 and the flip-flop 82 to the driver 38 and then onto the broadband medium, which in a preferred embodiment is the RF modem interface 32. The RF transmit sequencer 118 also starts receiving data flow from the CRC RAM 20.

The packet data therefore flows through the multiplexer 80 and the flip-flop 82 via the driver 38, onto the broadband medium 32. This continues until the broadband transmit sequencer 118, under control of the space marking data from the CRC RAM 20, receives its end-of-message marker. The RF transmit sequencer 118 then disables the transmit-enable signal, RFTREN, bringing the transmission to an end just as the last of the data packet has passed onto the broadband medium 32.

It will therefore be seen that the present broadband/baseband interface device provides for a baseband data packet to be received by the interface device and then retransmitted onto the broadband medium 32.

Although the present invention has been shown and described in terms of a specific preferred embodiment, those skilled in the art will appreciate that changes or modifications are possible which do not depart from the inventive concepts described and taught herein. Such changes and modifications are deemed to fall within the purview of these inventive concepts.

What is claimed is:

1. A broadband/baseband interface for passing data packets between a broadband medium and a baseband medium, said interface comprising:
   means for receiving a data packet from said broadband medium;
   detecting means for recognizing errors in said data packet, said errors including false end-marks found in said data packet, and an actual end-mark implanted in said data packet to mark the end of said data packet;
   counting means for counting said false and actual end-marks;
   transmitting means for transmitting said data packet over said baseband medium; and
   control means associated with said counting means for counting the false and actual end-marks registered by said counting means and stopping said transmitting means effective when said actual end-mark is counted by said control means.

2. The interface of claim 1, wherein said detecting means includes means for calculating cyclic redundancy checks of said data packet for finding said false and actual end-marks.

3. The interface of claim 1, wherein said receiving means comprises first memory means for temporarily storing said data packet.

4. The interface of claim 3, wherein said control means comprises second memory means for storing the recognition of said false and actual end marks in said data packet.

5. The interface of claim 4, wherein said control means further comprises addressing means for addressing the memory locations in said first and second memory means so that the memory location of each of said false and actual end-marks in said data packet is addressed in said second memory means at the same time as the data within said data packet where each of said end-marks actually occurs is addressed in said first memory means.

6. The interface of claim 5, wherein said counting means increments by one unit as it counts each of said false and actual end-marks while said data packet is being received over said broadband medium and decrements by one unit as each of said false and actual end-marks is addressed in said second memory means while said data packet is being transmitted over said baseband medium.

7. The interface of claim 6, wherein the transmission of said data packet over said baseband medium is terminated when said counting means reaches zero.

8. A broadband/baseband interface of passing data packets between broadband medium and a baseband medium, said interface comprising:
   receiving means for acceptance of data packets from said broadband medium;
   means for recognizing and storing message data incorporated in said broadband data packets;
   means for recognizing the end of a message incorporated in each of said broadband data packets, and for recognizing false end indications which may be included in said message;
   means for counting said false and actual end indications in each data packet; and
   transmitting means for driving said data packet on said baseband medium, said transmitting means being responsive to said counting means for ending transmission of said data packet on said baseband system at the end of said message.

9. A broadband/baseband interface for translating data signals from a broadband medium for use on a baseband medium comprising:
   (A) a broadband-receive state sequence by first sequencing means including:
      (a) means for synchronizing said interface to clock signals carried in said data signals when on said broadband medium,
      (b) means for identifying preliminary portions of said data signals,
      (c) means responsive to the ending of said preliminary portions of said data signals for creating message portions,
      (d) means for calculating sequences of said data signals for identifying patters among said data signals, said patterns identifying false and actual ends of said data signals, and
      (e) means for counting said false and actual ends; and
   (B) a baseband-transmit state sequenced by second sequencing means including;
      (a) baseband clocking means for synchronizing said interface for baseband data rates; and
      (b) means for driving said data signals on the baseband medium, said driving means being responsive to decreases in said counting means for identification of end of said groups of signals.

10. The interface of claim 9, wherein said calculating means comprises DRC means for detecting said false ends in said broadband signals and for recognizing said identifying patterns by subjecting said broadband signal to cyclic redundancy checking.

11. A method of passing data packets between a broadband medium and a baseband medium, said method comprising the steps of:

examining a data packet found on an incoming broadband signal;
calculating predetermined patterns in said data packet to recognize the end-mark of said data packet;
counting the number of recognized end-marks until said complete data packet has been received; and
transmitting signals corresponding to said data packet on a baseband medium, while counting out said recognized end-marks until reaching the last of said recognized end-marks, at which point said transmitting ceases.

* * * * *